US006934659B2

(12) United States Patent
Polzin

(10) Patent No.: US 6,934,659 B2
(45) Date of Patent: Aug. 23, 2005

(54) ADAPTIVE EEPROM STORAGE SYSTEM FOR TIRE PRESSURE LOSS DETECTION

(75) Inventor: Norbert Polzin, Zaberfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/670,811

(22) Filed: Sep. 24, 2003

(65) Prior Publication Data

US 2004/0133400 A1 Jul. 8, 2004

(30) Foreign Application Priority Data

Sep. 27, 2002 (DE) ......................................... 102 45 265
Nov. 29, 2002 (DE) ......................................... 102 55 777

(51) Int. Cl.$^7$ ............................................. G01L 17/00

(52) U.S. Cl. ..................................... 702/140; 702/127

(58) Field of Search ............................... 73/146, 146.4; 340/425.5, 438, 442, 443; 702/1, 33, 45, 47, 50, 51, 127, 138, 140, 188, 189

(56) References Cited

U.S. PATENT DOCUMENTS

| | | | | |
|---|---|---|---|---|
| 4,758,969 A | * | 7/1988 | Andre et al. ................. | 702/130 |
| 5,469,136 A | * | 11/1995 | Matsubara et al. ......... | 340/445 |
| 5,569,848 A | * | 10/1996 | Sharp ........................ | 73/146.2 |
| 5,753,809 A | * | 5/1998 | Ogusu et al. .............. | 73/146.2 |
| 5,940,781 A | * | 8/1999 | Nakajima .................... | 702/98 |
| 6,182,021 B1 | * | 1/2001 | Izumi et al. ................ | 702/138 |
| 6,313,742 B1 | * | 11/2001 | Larson ....................... | 340/442 |
| 6,501,372 B2 | * | 12/2002 | Lin ............................ | 340/442 |
| 6,584,427 B2 | * | 6/2003 | Kamiya et al. ............. | 702/140 |
| 6,691,059 B1 | * | 2/2004 | Griesser .................... | 702/140 |
| 6,754,615 B1 | * | 6/2004 | Germann et al. ............. | 703/8 |
| 6,804,623 B2 | * | 10/2004 | Oshiro ....................... | 702/140 |
| 2002/0075145 A1 | * | 6/2002 | Hardman et al. ........... | 340/442 |
| 2002/0130771 A1 | * | 9/2002 | Osborne et al. ............ | 340/438 |

FOREIGN PATENT DOCUMENTS

| | | |
|---|---|---|
| DE | 32 36 520 | 4/1984 |
| DE | 36 10 116 | 10/1987 |
| DE | 199 44 391 | 10/2000 |
| EP | 0 291 217 | 11/1988 |

OTHER PUBLICATIONS

Mayer, H;"Model Based Detection of Tyre Deflation by Estimation of a Virtual Transfer Function"; Pproceedings of 4th IEEE Conference on Control Applications; Sep. 28–29, 1995; pp 285–290.*

Hill, M; Maison, P; Turner, J;"The Development of a Low Cost System for Monitoring Tyre Pressures"; IE Colloquim on Chassis Electronics; Mar. 23, 1990; pp 2/1–2/3.*

Pohl, A; Ostermayer, G; Reindl, L; Seifert, F;"Monitoring the Tire Prressure at Cars Using Saw Sensors"; Proceedings IEEE Ultrasonics Symposium; vol. 1; Oct. 5–8, 1997; pp 471–474.*

Roberts, G;"A System that Monitors Whether or Not Tyres on Wheeled Vehicles are Under or Over Inflated . . . "; IEE Colloquim on Tyre Monitoring; Digest No. 1997/046; Mar. 25, 1997; pp 4/1–4/11.*

* cited by examiner

Primary Examiner—Bryan Bui
(74) Attorney, Agent, or Firm—Kenyon & Kenyon

(57) ABSTRACT

A method and an apparatus for monitoring an operating state of at least one tire of a vehicle are provided. The monitored operating state may be, for example, the air pressure of the tire. One tire state variable that represents the current operating state of the tire, and one calibration variable that represents the target tire state of the tire, are taken into consideration in the monitoring. The monitoring is accomplished in different monitoring modes, i.e., the particular monitoring mode employed is determined as a function of at least one driving state variable representing the driving state. In an example embodiment, for a given driving state variable, the vehicle speed is selected as the differentiation criterion for the different monitoring modes.

15 Claims, 5 Drawing Sheets

ADAPTIVE EEPROM STORAGE SYSTEM FOR TIRE PRESSURE LOSS DETECTION

FIELD OF THE INVENTION

The present invention relates to a method and an apparatus for monitoring an operating state of at least one tire of a vehicle.

BACKGROUND INFORMATION

The tires of a vehicle are among the systems most critical to driving safety during operation of the vehicle. A sudden pressure decrease, which regularly occurs as an indication of tire damage, can result in limited road adhesion and, in some cases, can render the vehicle no longer controllable. At high speeds, in particular, tire pressure losses can therefore have an extremely devastating effect. Prompt detection of a defective tire can thus make a considerable contribution to driving safety.

Systems which monitor the state of a tire, in particular the air pressure, are known in the art. In addition to direct determination of the air pressure of a tire, the rotation speeds of the wheels can be employed in order to determine a change in tire pressure. For example, changes in the rotation speeds of individual wheels can be sensed and used to demonstrate a change in the operating state of the tires.

Published German patent documents DE 36 10 116 and DE 32 36 520 describe monitoring systems which indicate the tire state in the context of specific operating states (traveling straight ahead without deceleration or acceleration). These documents also describe a normalization of the rotation speeds to the respective vehicle speed.

For indirect-measurement tire-pressure monitoring systems, the use of differences in wheel rotation speeds of individual wheels for tire state detection is known, for example, from European Patent 0 291 217. In such systems, pressure losses can be ascertained by way of the deviation in wheel speeds in the context of a reduced tire circumference.

Published German Patent Application 199 44 391 describes the adaptation of a calibration value serving to monitor tire pressure. In this method, a recalibration of the tire pressure system is performed on the basis of a modified operating state of the tire, the old value being overwritten.

SUMMARY OF THE INVENTION

The present invention provides a method and an apparatus with which an operating state of at least one tire of a vehicle can be monitored. The monitored operating state may be, for example, the air pressure of the tire. Provision is further made that, one tire state variable that represents the current operating state of the tire, and one calibration variable that represents the target tire state of the tire, are taken into consideration in the monitoring. In accordance with the present invention, the monitoring is accomplished in different monitoring modes. The particular monitoring mode employed is determined as a function of at least one driving state variable representing the driving state.

In an example embodiment of the present invention, the monitoring mode is selected as a function of a comparison of the driving state variable to a definable limit value. For example, the vehicle speed can be compared to a given speed, the monitoring mode being changed if the given speed is exceeded. The present invention provides two monitoring modes, a transition from the first monitoring mode (in which the monitoring normally begins) into the second monitoring mode taking place as a function of the comparison. In addition to the exceedance of the defined limit value, the behavior over time of the exceedance of the limit value is also monitored for the comparison. As a result of the comparison, the transition into the second monitoring mode is performed only if the exceedance of the limit value persists for a definable period of time. In a further embodiment of the invention, it is provided that no further comparison is performed after the change into the second monitoring mode has taken place. As a result, no further change in the monitoring mode is provided for.

In an example embodiment, provision is made for selecting the vehicle speed, as a differentiation criterion between the individual monitoring modes, as the driving state variable. This makes possible a monitoring process adapted to the instantaneous driving state.

In accordance with the present invention, provision is made for equipping each monitoring mode with at least one calibration mode. Provision is further made for each calibration mode to contain at least one calibration variable. It is thus possible to achieve, within the individual monitoring modes, fine gradations that permit accurate identification and monitoring of the operating state of the tire. In order to adapt the determination of the calibration variables as closely as possible to the actual operation of the vehicle, the calibration variables are determined as a function of a series of parameters. At least one tire state variable, one driving state variable, one calibration request, and/or the monitoring mode, for example, are included in the determination of the calibration variable. It is thus possible to eliminate spikes or brief disturbances from the determination by taking an average of several tire state variables in the determination of the calibration variables.

With the driving state variable, for example the vehicle speed, a calibration adapted to the modified physical behavior of the tire at high speeds, for example, can be taken into account. The calibration request moreover allows a calibration to be performed in controlled fashion when permitted by the driving situation.

In an example embodiment of the present invention, the determination of the calibration variable is performed as a function of the number of tire state variables acquired, and the monitoring mode. Provision is made in particular, in this context, for determining a calibration variable of a first kind and/or a calibration variable of a second kind, depending on the defined number of tire state variables that have entered into the determination. An example embodiment provides for the calibration variable to be determined as the average of the number of tire state variables that have entered into the determination.

In accordance with the present invention, the determination of the calibration variable of the first kind is performed until the prerequisite for creation of the calibration variable of the second kind. Provision is additionally made for further determination of the calibration variable to be terminated when the calibration variable of the second kind has been created. However, the determination of a new calibration variable may be performed again if a calibration request is identified.

The dependence of the monitoring operation on the monitoring mode represents a further example embodiment of the invention. Here, a tire state variable which represents the current tire state is determined, and is referred to the calibration variable of the monitoring mode. From the comparison, associated therewith, of the two variables, a malfunction is identified if the difference goes outside a defined range, i.e., beyond a defined threshold value. In an example embodiment of the present invention, the defined range or the threshold value is selected as a function of at least one driving state variable, for example the vehicle speed. As a result, nonlinear or only locally linear correlations between rolling circumference and vehicle speed can also be taken into account. Alternatively or simultaneously, however, the monitoring can also be selected as a function of the number of tire state variables used for determination of the calibration variable. The advantage of this embodiment lies in the fact that the threshold values have different sensitivities as a result of the modification. A large number of tire state variables in the context of determination of the calibration variable thus reduces the variability of the tire state variables that is sensed, thereby permitting more-sensitive monitoring.

In accordance with the present invention, the monitoring of the tire state is accomplished by way of a tire state variable representing the tire state, the tire state variable being created on the basis of wheel rotation speeds. The determination of the tire state variable is ascertained by creating a difference between the wheel speeds at at least two wheels in each case. Provision is made here, in particular, for creating the difference in wheel speeds at the wheels of one axle and/or at the diagonally located wheels. In addition to this, however, the possibility also exists of determining the tire state variable by creating a difference between the sums of the wheel rotation speeds at the wheels of the front axle and of the rear axle. It is also possible, however, to determine the tire state variable as the difference between the sums of the wheel rotation speeds at the wheels of the left and of the right side of the vehicle. In a further embodiment, provision is moreover made for normalizing the created differences to the vehicle speed. Provision is furthermore made for ascertaining the wheel rotation speed by way of a wheel dynamics variable representing the wheel rotation speed.

In accordance with the present invention, the calibration request may be accomplished at a defined point in time. The point in time can be determined by way of a command initiated by the driver, or automatically by detecting a tire change or an operation of adding air to the tire.

The present invention may provide that upon detection of a malfunction, i.e., upon occurrence of a pressure loss in a tire, the driver is informed thereof acoustically and/or optically. It is furthermore possible, upon detection of a malfunction, to activate a braking system present in the vehicle and/or an active steering system, in such a way that the vehicle's reaction counteracts the cause of the malfunction. Dangerous driving situations resulting from a pressure loss in the tires can thus be compensated for or mitigated.

In a further example embodiment of the invention, the fact that the definable limit value has been exceeded by the driving state variable during a defined time is interpreted as a prerequisite for a tire state in which a plastic deformation of the tire is occurring.

DETAILED DESCRIPTION

Figure 1:
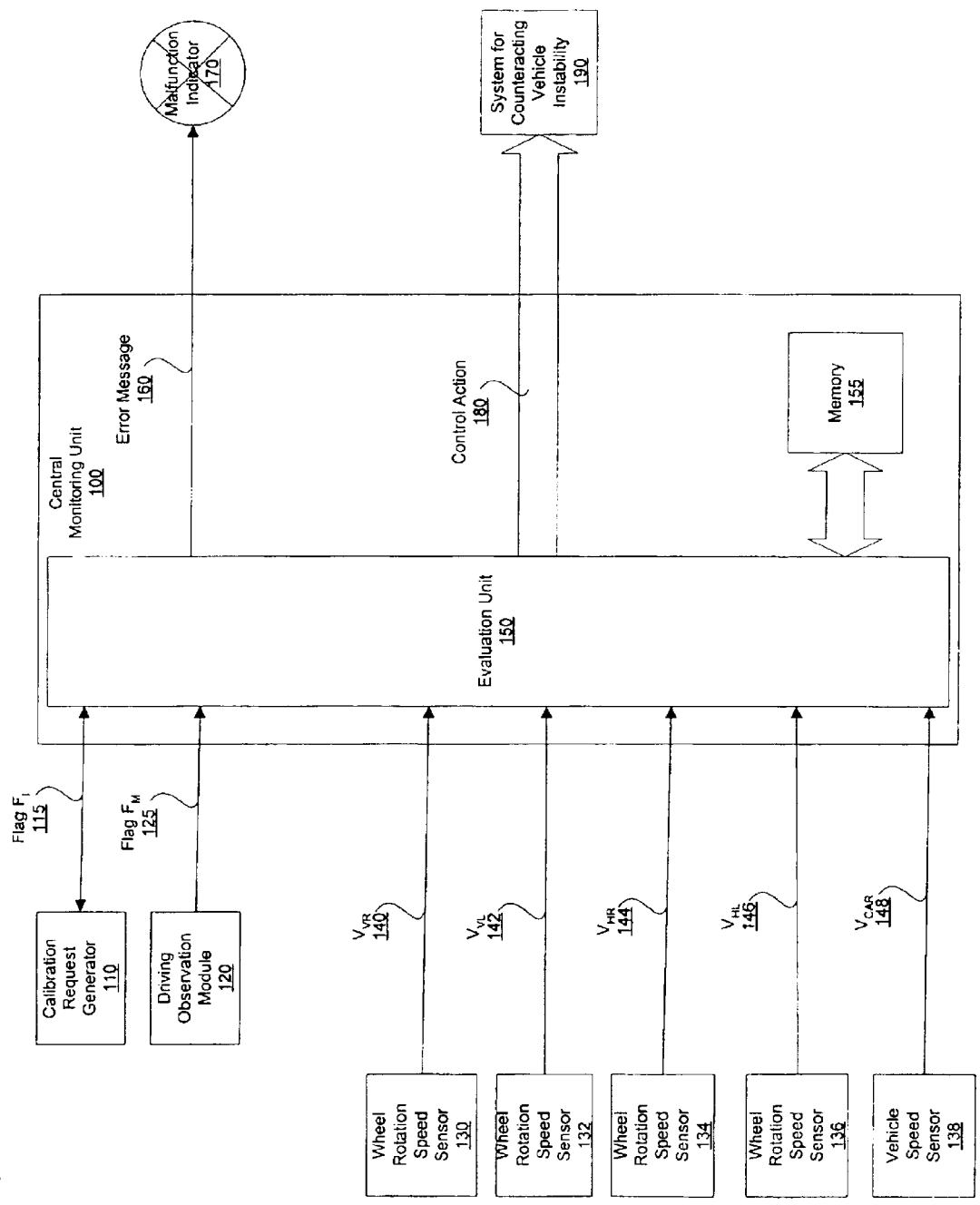
FIG. 1 shows, in a block diagram, the acquisition of operating variables that are necessary for monitoring of the tire state, and the processing of the read-in values and forwarding of a detected malfunction.

FIG. 1 shows an exemplary embodiment for monitoring of a vehicle having four tires. An adaptation of the example to a vehicle having additional tires is certainly possible, but not necessary for presentation of the example. For acquisition of the monitoring parameters necessary for monitoring, each wheel equipped with a tire possesses a wheel rotation speed sensor (130 through 136) for ascertaining the wheel rotation speed. From these wheel rotation speed sensors (130 through 136), the wheel rotation speed variables $v_{VR}$ (140), $v_{VL}$ (142), $v_{HR}$ (144), and $v_{HL}$ (146), which represent the wheel rotation speeds, are forwarded to central monitoring unit 100. To complete the driving-dynamics variables for monitoring, monitoring unit 100 reads out of a corresponding system 138 a variable $v_{car}$ (148) representing the vehicle speed. In block 150, tire state variables $\Delta v_A$, $\Delta V_D$ which represent the tire state of the wheels are ascertained from these read-in values.

An initialization, which can be accomplished manually by the driver and/or automatically, for example by a calibration request generator 110, in the context of a tire change or an operation adding air to the tire, causes a flag $F_I$ (115) to be set, i.e., flag $F_I$ changes from the value 0 to the value 1. A further exemplified embodiment shows, however, that in addition to continuous setting of the flag, a brief setting of flag $F_I$ (115) is sufficient for initialization of the calibration operation.

In block 150, because flag $F_I$ (115) is set, calibration values are created from the tire state variables as a function of the read-in vehicle speed variable $v_{car}$ (148). Only wheel speed variables (140 through 146) that are suitable for the purpose are used, however, to ascertain the tire state variables. Certain driving situations are conceivable—for example heavy braking/acceleration, cornering, or an ABSR/ESP control action—that do not supply tire state variables suitable for evaluation. To filter such driving situations out of the monitoring process and the determination of calibration variables, a driving observation module 120 is used; this detects the corresponding driving situations and sets a flag $F_M$ (125) if monitoring and calibration are to be briefly discontinued.

Since the tires have different physical properties depending on the rotational velocity of the wheel, various speed ranges are set up. This can be done, for example, using the index B as shown in the following table:

| Index B | Speed Range $V_B$ [km/h] |
| --- | --- |
| 1 | 0–50 |
| 2 | 51–100 |
| 3 | 101–150 |
| 4 | 151–200 |
| 5 | 201–250 |

However, other subdivisions adapted to the particular vehicle are also conceivable. It is furthermore possible to make the speed ranges variable during operation of the vehicle.

Since the behavior of the tires also changes along with the tire properties, it is necessary to ascertain separate calibration variables for each speed range. In the context of monitoring the operating state of the tires, the vehicle speed variable $v_{car}$ (148) is therefore employed in order to allocate the corresponding calibration variable.

The calibration variables ascertained in the individual speed ranges, as well as the number n of tire state variables taken into account in that context, are stored in a memory 155 and read out as necessary. If a malfunction is identified in the course of the monitoring, the driver can be informed thereof. This can be accomplished both optically and acoustically via a corresponding indicator 170. It is also conceivable, on the basis of the detected malfunction, for a system 190 located in the vehicle, which counteracts the possible impairments of driving behavior resulting from the tire pressure loss by way of a corresponding control action 180, to be activated. Present-day systems that can perform this are, for example, an ABS, ESP, or an active steering system.

Figure 2:
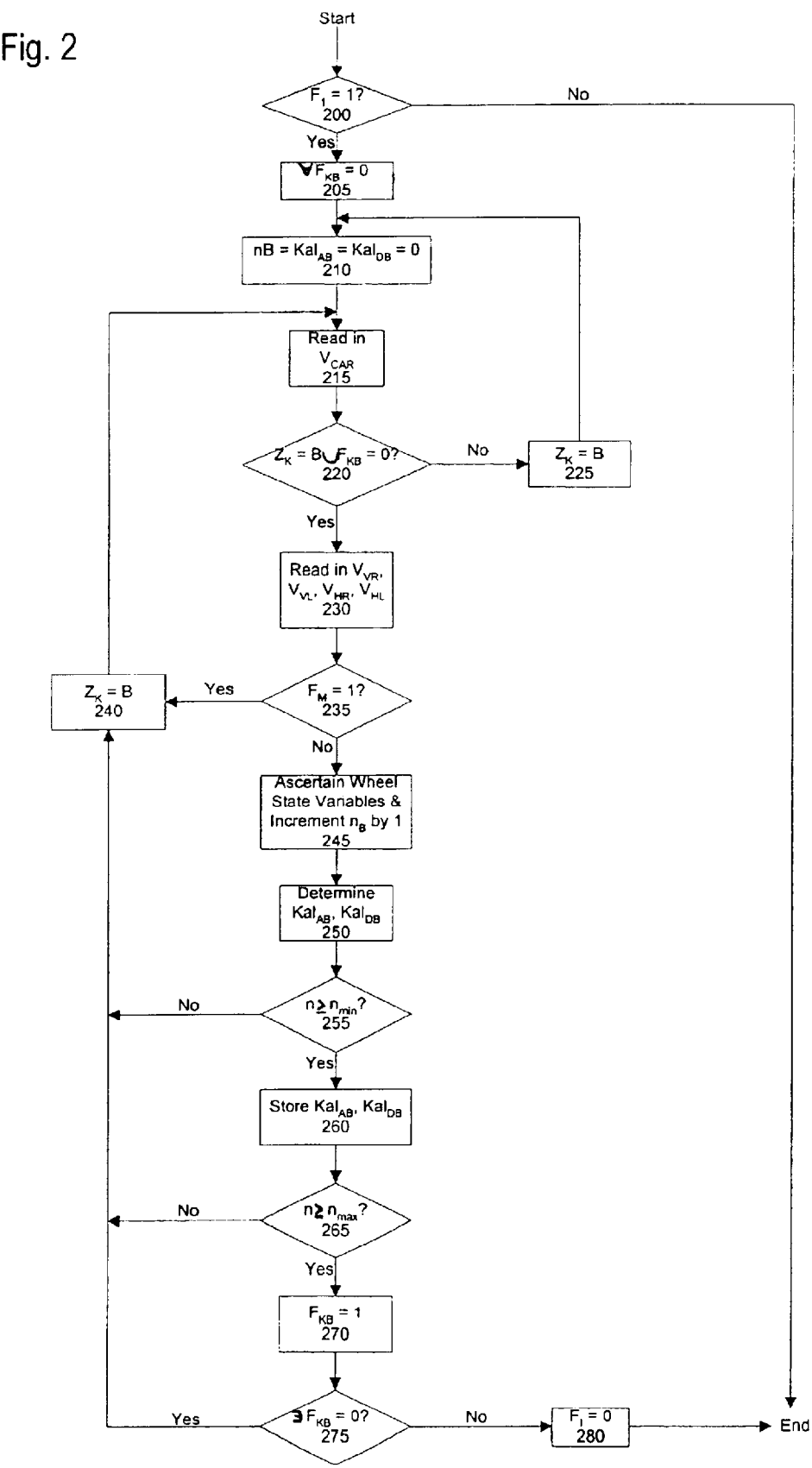
FIG. 2 depicts in a flow-chart the initialization and determination of the calibration variables.

The flow chart in FIG. 2 describes one possible program sequence for ascertaining the calibration variables that are required as reference values for monitoring the tire state, e.g., the tire air pressure. In a first step 200 the calibration request is queried. This is done by querying flag $F_I$ (115). If an unset flag $F_I$ (115) is detected, i.e., $F_I=0$, the program terminates execution. If, however, a set flag $F_I$ (115) (i.e., $F_I=1$) indicates that a calibration request has been made by the driver or on the basis of automatic detection, then in the next step 205 the flags $F_{KB}$, which represent a successful determination of a calibration variable for speed range $V_B$ by way of a set flag $F_{KB}=1$, are set to a value of 0 for all indices B. In step 210, execution pass variable $n_B$ and calibration variables $Kal_{AB}$ for single-axle monitoring and $Kal_{DB}$ for diagonal monitoring are also set to 0 for all indices B. For determination of the current speed range $V_B$, in step 215 vehicle speed variable $v_{car}$ (148), representing the vehicle speed, is read in. A comparison of vehicle speed variable $v_{car}$ (148) to the previously subdivided speed ranges $V_B$ allows a determination of the range in which the vehicle is located. This comparison yields the associated value of index B that is used for further determination of the calibration variable. If it is found by way of execution pass variable $n_B$ that the current execution pass for ascertaining the calibration variable is the first one, i.e., if $n_B=0$, the value of index B belonging to the current speed range $V_B$ is then stored in a variable $Z_K$. This allows identification of the calibration variable that has been determined, and allocation thereof to the associated speed range. Step 220 then checks whether the current speed range $V_B$ matches the range in which the calibration is to be performed. This is done by comparing the value of B determined in step 215 to the variable $Z_K$. This comparison thus allows identification of a switchover into a different speed range brought about by a change in vehicle speed $v_{car}$ (148). At the same time, the existence of an already determined calibration variable of the second kind for speed range $V_B$ is queried by way of flag KB. As already described, a set flag $F_{KB}=1$ indicates the presence of a calibration variable of the second kind in the corresponding speed range $V_B$. If the decision upon combination of the two comparisons $B=Z_K$ and $F_{KB}=0$ is negative, then in step 225 the allocation $Z_K=B$ is made, in order to adapt variable $Z_K$ to the current speed range with the value of index B. After this allocation in step 225, step 210 starts a new cycle for determining the calibration variable. In the event of a positive outcome of the comparison in step 220, the program proceeds with the next step 230. Here the wheel rotation speeds $v_{VR}$ (140), $v_{VL}$ (142), $V_{HR}$ (144) and $v_{HL}$ (146) are read in. If the vehicle is in a driving situation that does not permit determination of a tire state variable suitable for evaluation, flag $F_M$ (125) is then set, i.e., $F_M=1$. Because this flag $F_M$ (125) is set, in step 235 execution branches to step 240 of the flow chart, in which the allocation $Z_K=B$ is made in order to adapt variable $Z_K$ to the current speed range of index B. Once the allocation $Z_K=B$ has been made in step 240, the program loops back to step 215.

If an impermissible driving situation was not identified, however, i.e., if $F_M=0$, then in step 245 the equations $$\Delta v_A := \{(v_{VL}+v_{VR})-(v_{HL}+v_{HR})\}/v_{car},$$

$$\Delta v_D := \{(v_{VL}+v_{HR})-(v_{VR}+v_{HL})\}/v_{car}$$

are used to ascertain the wheel state variables, which are determined on both a single-axle ($\Delta v_A$) and diagonal basis ($\Delta v_D$) for wheel rotation speed variables $v_{VR}$ (140), $v_{VL}$ (142), $v_{HR}$ (144), and $v_{HL}$ (146), normalized to the vehicle speed $v_{car}$ (148). Also in step 245, the execution pass variable $n_B$ is incremented:

$n_B=n_B+1$.

The wheel state variables $\Delta v_A$ and $\Delta v_D$ ascertained in this fashion are then used, in step 250, to ascertain calibration variables $Kal_{AB}$ and $Kal_{DB}$, using $$Kal_{AB} = Kal_{AB} + \frac{Kal_{AB} - \Delta v_{AB}}{n_B}$$

and $$Kal_{DB} = Kal_{DB} + \frac{Kal_{DB} - \Delta v_{AB}}{n_B}$$

In order to define a calibration variable of the first kind, in step 255 a minimum number $n_{min}$ is defined which must be reached or exceeded by execution pass variable $n_B$ in order to reach step 260. If, on the other hand, at this point in time fewer tire state variables than the required number have entered into the determination of the calibration variable of the first kind, the algorithm is then continued with step 240. In addition to a minimum number $n_{min}$ for all speed ranges $V_B$, in another example embodiment it is also conceivable to define, using $n_{min,B}$, a separate minimum number for each individual speed range $V_B$.

If it is found in step 255 that a sufficient number of tire state variables have entered into the determination of the calibration variable of the first kind, in step 260 calibration variables $Kal_{AB}$ and $Kal_{DB}$ are stored in memory 155. For determination of a calibration variable of the second kind, step 265 checks, by a comparison to execution pass variable $n_B$, whether the maximum number $n_{max}$ of tire state variables that have entered into the determination of the calibration variable has been reached or exceeded. By analogy with the comment regarding minimum number $n_{min}$, an example embodiment is also possible for maximum number $n_{max}$ in which, using $n_{max,B}$, a separate maximum number can be defined for each individual speed range $V_B$. The values according to the table below can be used as an example for the minimum and maximum numbers $n_{min}$ and $n_{max}$:

| $n_{min}$ | $n_{max}$ |
|---|---|
| 250 | 5000 |

If the result of the check in step 265 is negative, i.e., if fewer tire state variables than the maximum number have been used for ascertaining the calibration variable, the algorithm is then continued in step 240. If, however, it is found in step 265 that a sufficient number of tire state variables ($n_B \geq n_{max}$) have entered into the determination of the calibration variable, this calibration variable of the second kind then constitutes the comparison variable for the corresponding speed range $V_B$ until the next identification of a calibration request $F_I=1$. In the comparison to the calibration variable of the first kind, the calibration variable is no longer modified in a further execution pass without a calibration request. This is indicated by the fact that in step 270, flag $F_{KB}$ belonging to the corresponding speed range $V_B$ is set, i.e., $F_{KB}=1$. Step 275 then queries whether one of the flags $F_{KB}$ for all indices B is still unset. Since this would indicate a missing calibration variable of the second kind, a positive decision in step 275 moves execution to step 240 for further processing. If, however, flags $F_{KB}$ are set for all indices B, then in step 280 flag $F_I$ (155) is deleted, i.e., reset $F_I=0$. This reset is forwarded to block 110 in order to make possible another calibration request by the driver or on the basis of automatic detection. The program is then terminated, before being restarted either at regular time intervals or on the basis of a calibration request.

Figure 3:
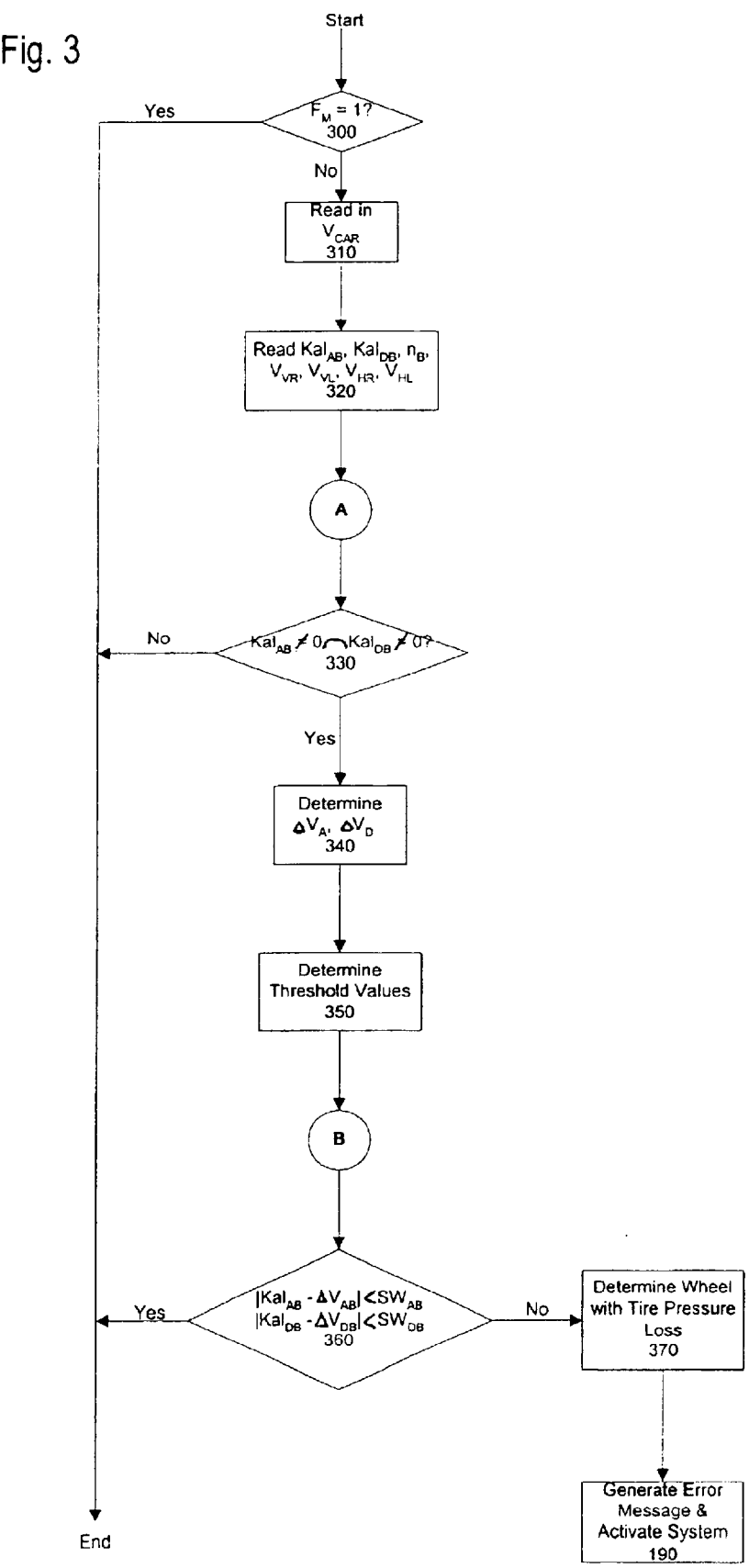
FIG. 3 depicts in a flow-chart the sequence of monitoring the tire air pressure.

One possible algorithm for monitoring tire states, e.g., tire air pressures, is depicted with reference to a flow chart in FIG. 3. Once the algorithm has been started, in step 300 flag $F_M$ (125) is queried. If it is found here that flag $F_M$(125) is set, i.e., $F_M=1$, meaning the vehicle is in a driving situation that is unsuitable for evaluation of a tire state variable, the algorithm is immediately terminated. If an unset flag $F_M$ (125) is found, however, then in step 310 the vehicle speed variable $v_{car}$ (148) representing the vehicle speed is read in. By comparing vehicle speed variable $v_{car}$ (148) to the previously subdivided speed ranges $V_B$, it is possible to determine the range in which the vehicle is currently located. This comparison yields the associated value of index B, which defines the monitoring range and is used for further monitoring. In the next step 320, calibration variables $Kal_{AB}$ and $Kal_{DB}$ and execution pass variable $n_B$, in addition to wheel rotation speed variables $v_{VR}$ (140), $v_{VL}$ (142), $v_{HR}$ (144) and $v_{HL}$ (146), are read out of memory 155. The check as to whether calibration variables exist in the current speed range $V_B$ is then performed in step 330. The existence of the calibration variables for speed range $V_B$ can be queried explicitly, for example, by making the comparisons $Kal_{DB} \neq 0$ and $Kal_{DB} \neq 0$ If both calibration variables have a value of 0, the algorithm is terminated until the next start instruction. If the comparison in step 330 is positive, however, then in step 340 the single-axle $\Delta v_A$ and diagonal $\Delta v_D$ tire state variables are ascertained using $\Delta v_A := \{(v_{VL}+v_{VR})-(v_{HL}+v_{HR})\}/v_{car}$, $\Delta v_D := \{(v_{VL}+v_{HR})-(v_{VR}+v_{HL})\}/v_{car}$ based on wheel rotation speed variables $v_{VR}$ (140), $v_{VL}$ (142), $v_{HR}$ (144) and $v_{HL}$ (146) determined in step 320 and normalized to vehicle speed $v_{car}$ (148). If however, only one calibration variable $Kal_{AB}$ or $Kal_{DB}$ is set to 0 in step 330, the associated tire state variable is not determined.

Before the calibration variables are compared to the tire state variables that have been ascertained, the permissible defined threshold values $SW_{AB}$ and $SW_{DB}$ must be adapted to the number of tire state variables serving as basis for the calibration variable. More specifically, the less sensitive (i.e. higher) threshold values must be, the smaller the number of tire state variables serving as basis for the calibration variables. In the present example embodiment, therefore, in step 350 the threshold values are ascertained as a function of the number $n_B$ of tire state variables that have entered into the calibration. Using the equations $SW_{AB} = SW_{AB} * (1+SW_F)$ and $SW_{DB} = SW_{DB} * (1+SW_F)$ for example, the threshold values can be modified by the factor $SW_F$ as a function of the number $n_B$. One possible allocation of the modification factor in relation to the number $n_B$ is shown by the following table:

| $n_B \geq$ | Factor $SW_F$ |
|---|---|
| 250 | 1/10 |
| 500 | 5/100 |
| 1000 | 2/100 |
| 2000 | 1/100 |
| 3300 | 3/500 |
| 5000 | 1/500 |

For example, a number $2000 > n_B > 1000$ means a modification of the threshold values by a factor of 1.02. For finer gradations, it is possible to select additional subdivisions or an entirely different allocation. The dependence of the threshold value on the number of tire state variables included in the determination of the calibration variable is not, however, the only conceivable dependence. In a further example embodiment, the threshold values are modified as a function of the vehicle speed $v_{car}$ (148) and the speed range $V_B$.

The threshold values $SW_{AB}$ and $SW_{DB}$ ascertained in step 350 are then used in step 360 to determine the deviation of the ascertained tire state variables $\Delta v_A$ or $\Delta v_D$ from calibration variables $Kal_{AB}$ and $Kal_{DB}$. This is done by checking whether the equations $|Kal_{AB} - \Delta v_{AB}| < SW_{AB}$ or $|Kal_{DB} - \Delta v_{DB}| < SW_{DB}$ are satisfied. If so, the algorithm is terminated with no further consequences. If one of the deviations goes beyond the threshold value, the wheel that is exhibiting a tire pressure loss can be deduced in step 370, based on a synopsis of the deviations. In step 380, the algorithm completes the monitoring cycle with an error message 160 to an acoustic and/or optical indicator 170 which informs the driver of the tire pressure loss, and a suitable activation 180 of a system 190 for compensating for the threat of a loss of driving stability.

Figure 4:
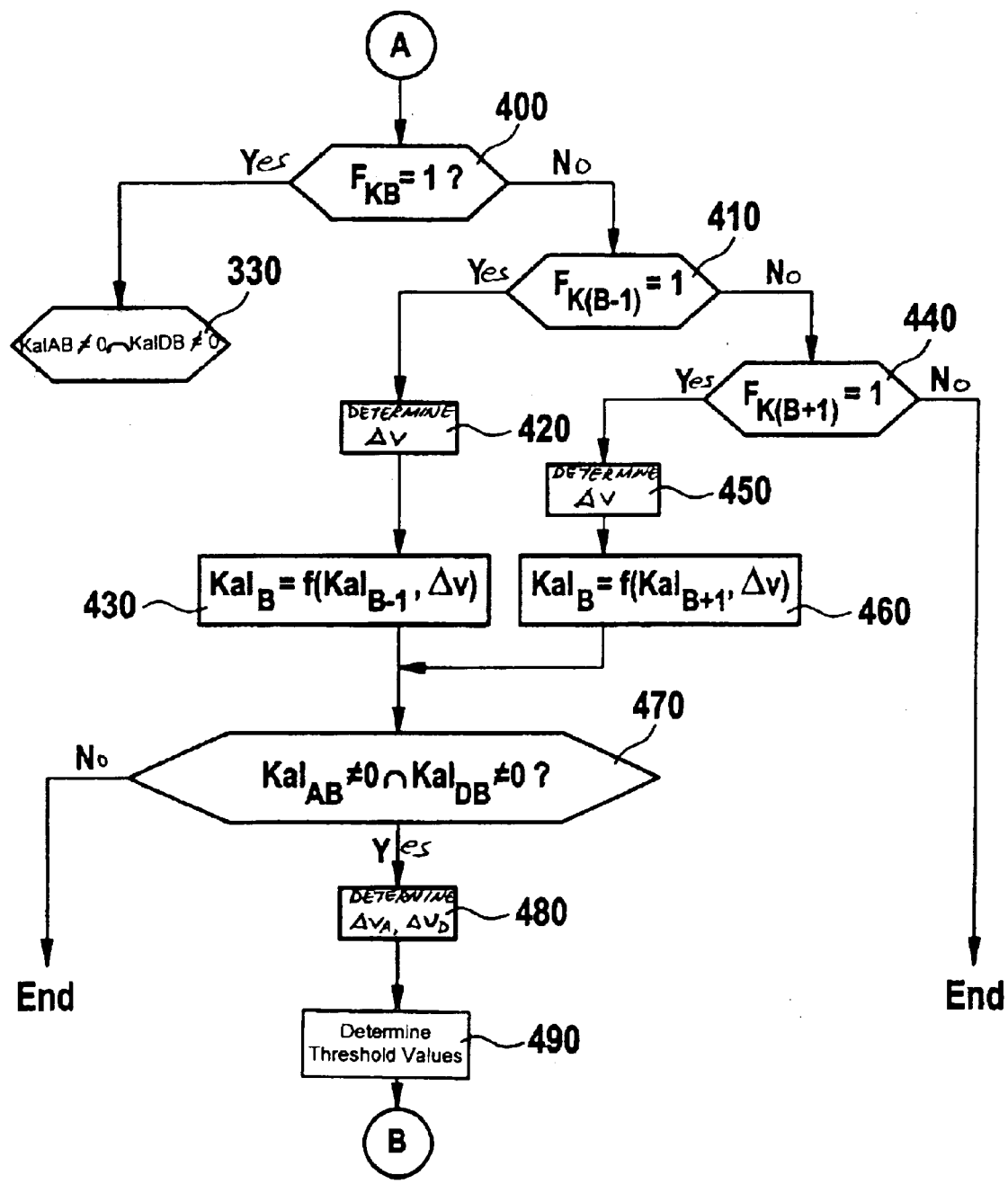
FIG. 4 depicts in a flow-chart the procedure of a further exemplary embodiment of the present invention.

In addition to the monitoring of tire pressure in speed ranges using incompletely performed calibration values, a further example embodiment of the present invention may utilize extrapolation of calibration values for those speed ranges for which a complete calibration has not yet been performed. To achieve this, in the program sequence shown in FIG. 3, after wheel rotation speed variables $v_{VR}$ (140), $v_{VL}$ (142), $v_{HR}$ (144) and $V_{HL}$ (146) as well as calibration variables $Kal_{AB}$ and $Kal_{DB}$ and execution pass variable $n_B$ have been read in from memory 155, a further program section illustrated in FIG. 4 is executed. In this program section, step 400 first checks, using $F_{KB}=1$, whether a complete calibration has been performed, and a corresponding calibration value $Kal_{AB}$ or $Kal_{DB}$ exists, in the current speed range B in which the vehicle is located. If it is found that a complete calibration has already been accomplished, program execution continues with step 330 in FIG. 3. If a complete calibration has not yet been performed, however, step 410 then checks, with $F_{K(B-1)}=1$, whether a calibration value from a complete calibration is available for speed range B−1 located below speed range B. If so, a calibration data set $Kal_{AB}$ and $Kal_{DB}$ for speed range B is extrapolated from calibration data set $Kal_{A(B-1)}$ and $Kal_{D(B-1)}$ for speed range B−1. This is done by first, in step 420, creating the difference between the current vehicle speed $v_{car}$ (148) and the maximum limit speed for speed range B−1, using:

$$\Delta v = |v_{car} - \text{max. limit speed of range B-1}|$$

$\Delta v$ being an indication of the deviation of the current vehicle speed $v_{car}$ (148) from the next-lower speed range. As a function of this deviation and in conjunction with the calibration values from speed range B−1, calibration values for speed range B are generated using $$Kal_B = f(Kal_{B-1}, \Delta v).$$

One possible allocation of the calibration values can be made using $$Kal_{AB} = Kal_{A(B-1)} * (1 + Kal_F)$$

and $$Kal_{DB} = Kal_{D(B-1)} * (1 + Kal_F);$$

the modification of the calibration variables $Kal_F$ as a function of $\Delta v$ can be performed, for example, in accordance with the following table:

| Deviation (km/h) | Factor $Kal_F$ |
| --- | --- |
| 0 < Δv ≤ 5 | 2/100 |
| 5 < Δv ≤ 10 | 5/100 |
| 10 < Δv ≤ 20 | 1/00 |
| 20 < Δv ≤ 30 | 2/10 |
| 30 < Δv ≤ 40 | 5/10 |

If it is found in step 410 that a complete calibration has not been performed in speed range B−1, then in step 440 a corresponding query is made for speed range B+1. If flag $F_{K(B+1)}$ is not set, the monitoring is discontinued. If, however, $F_{K(B+1)}=1$ indicates detection of a complete calibration in speed range B+1, then in accordance with the procedure in steps 420 and 430, the deviation of the current vehicle speed $v_{car}$ (148) from the next-higher speed range B+1 is ascertained in step 450 using $$\Delta v = |v_{car} - \text{min. limit speed of range B+1}|.$$

This is followed in step 460 by an extrapolation of the calibration values for speed range B using $$Kal_B = f(Kal_{B+1}, \Delta v).$$

As explained above in connection with step 430, one possible allocation of the calibration values involves the use of $$Kal_{AB} = Kal_{A(B+1)} * (1 + Kal_F)$$

and $$Kal_{DB} = Kal_{D(B+1)} * (1 + Kal_F).$$

The modifications of the calibration variable $Kal_F$ can be performed in accordance with the table presented above.

Step 470 then checks for the existence of calibration variables in the calibration data set of the current speed range $V_B$. If both calibration variables have the value 0, the algorithm is terminated until the next start instruction. If the result of the comparison in step 470 is positive, however, then in step 480 the single-axle tire state variable $\Delta v_A$ and diagonal tire state variable $\Delta v_D$ are ascertained, similarly to step 340, using $$\Delta v_A := \{(v_{VL}+v_{VR})-(v_{HL}+v_{HR})\}/v_{car}$$

$$\Delta v_D := \{(v_{VL}+v_{HR})-(v_{VR}+v_{HL})\}/v_{car}$$

based on wheel rotation speed variables $v_{VR}$ (140), $v_{VL}$ (142), $v_{HR}$ (144) and $v_{HL}$ (146) determined in step 320 and normalized to vehicle speed $v_{car}$ (148). If, however, in step 470 a calibration variable $Kal_{AB}$ or $Kal_{DB}$ is set to 0, the associated tire state variable is not ascertained.

In the context of monitoring using extrapolated calibration variables, an adaptive adaptation of the threshold values as a function of the speed deviation $\Delta v$ can additionally be performed, as shown in step 490. For example, using $$SW_{AB} = SW_{AB} * (1 + SW_F)$$

and $$SW_{DB} = SW_{DB} * (1 + SW_F),$$

the corresponding threshold values can be assigned a correction factor $SW_F$ that can be selected as a function of $\Delta v$. The table below represents one possible allocation:

| Deviation km/h | Factor $SW_F$ |
| --- | --- |
| 0 < Δv ≤ 5 | 2/100 |
| 5 < Δv ≤ 10 | 5/100 |
| 10 < Δv ≤ 20 | 1/00 |
| 20 < Δv ≤ 30 | 2/10 |
| 30 < Δv ≤ 40 | 5/10 |

Once the modified threshold values for the extrapolated calibration variables have been ascertained, monitoring is continued with step 360 as depicted in FIG. 3.

Figure 5:
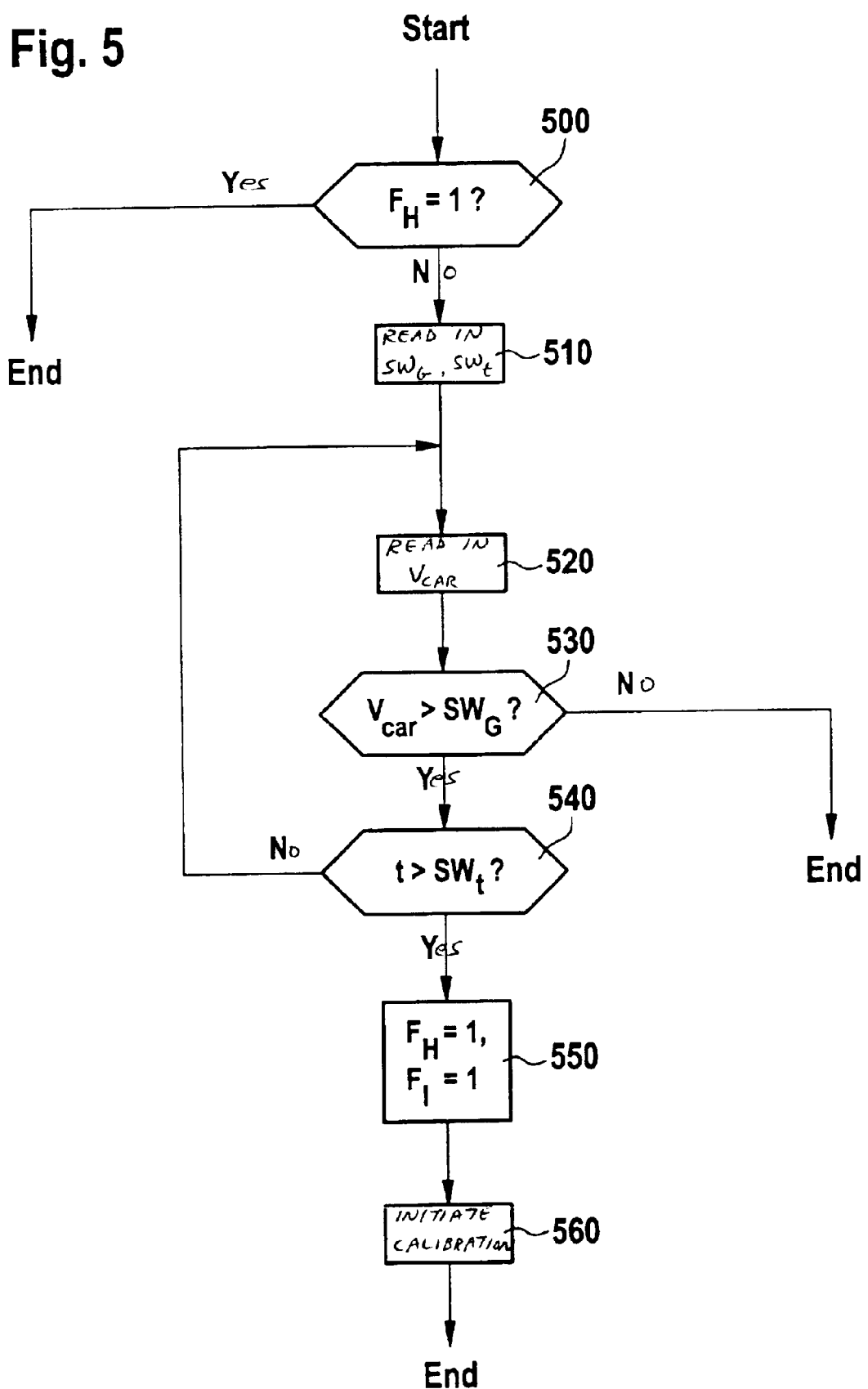
FIG. 5 depicts in a flow-chart the operation of monitoring attainment of a high-speed range.

FIG. 5 depicts a further example embodiment in which exceedance of a limit value by a driving state variable indicates a change in a monitoring mode. The change in monitoring mode generates a calibration request (115) and, optionally, the algorithm described in FIG. 2 is started immediately thereafter.

In the example embodiment shown in FIG. 5, step 500 first queries whether a high-speed range has already been attained at earlier points in time during vehicle operation. This can be determined, for example, if a flag $F_H$ is set, i.e., $F_H=1$. If a set flag $F_H$ is detected, the algorithm shown in FIG. 5 is terminated. Otherwise, in step 510, limit values $SW_G$ and $SW_t$ are read in from memory 155. Limit value $SW_G$ represents a vehicle speed value that, when exceeded the first time by a new tire, results in an irreversible one-time plastic deformation (spreading) of the tire. In order for a deformation of the tire to be observed, however, the tire must be driven for a defined time $SW_t$ above vehicle speed $SW_G$. Both variables are specific to the tire, and can be updated in memory 155, for example, by way of an external update or an automatic detection of the tire or of a tire change. In addition to the reading in of values $SW_G$ and $SW_t$, an internal timer is started (t=0) in step 510. In the next step 520, the instantaneous vehicle speed $v_{car}$ (148) is read in. In step 530 this instantaneous vehicle speed $v_{car}$ (148) is compared to limit value $SW_G$. If the instantaneous vehicle speed $v_{car}$ (148) is below limit value $SW_G$, the algorithm is terminated. If $v_{car}$ (148) exceeds $SW_G$, however, then in step 540 the behavior over time of the exceedance is checked. If it is found that the tire has not yet been driven for sufficient time at the corresponding speed, the algorithm continues to execute with step 520. If, however, the tire has been operated for a defined time above the stipulated speed limit value $SW_G$, i.e., if the comparison t>$SW_t$ gave a positive result, then in step 550 flags $F_H$ and $F_I$ (115) are set, and are stored in memory 155. A set flag $F_H=1$ indicates that the tires have experienced a plastic deformation. A set flag $F_I=1$ moreover makes possible a restart of the calibration algorithm that was presented in a previous exemplified embodiment. Optionally, in step 560, subsequent to step 550, initiation of the calibration algorithm (e.g., in accordance with the example embodiment of FIG. 2) can then also be enabled before the algorithm shown in FIG. 5 is complete.

The case of a single new tire plays a critical role in the consideration of the irreversible one-time plastic deformation of new tires when a speed threshold is exceeded. If, for example, a spare tire is mounted on a vehicle that already has three previously broken-in tires, the calibration operation must be restarted, since otherwise the deformation of the new tire after exceedance of the speed threshold value would cause the spare tire to roll more slowly. The calibration operation can be restarted on the one hand manually by the driver of the vehicle, but also automatically by resetting flag $F_I$, i.e., $F_I=0$. This can be done, for example, by manual deletion of flag $F_I$ (115) by the mechanic or the driver upon replacement of the tire. Another possibility is that replacement of a tire is detected automatically and causes a reset of flag $F_I$ (115).

The algorithms presented in the example embodiments set forth above can be started for monitoring at regular intervals, or on the basis of a deliberate action by the driver.

What is claimed is:

1. A method for monitoring an operating state of at least one tire of a wheel of a vehicle, comprising:
    selecting one of at least two different monitoring modes as a function of at least one driving state variable that represents a driving state of the vehicle and determined on the vehicle;
    monitoring at least one tire state variable that represents a current operating state of the tire; and
    monitoring at least one calibration variable that represents a target state of the tire, wherein:
    a first monitoring mode and a second monitoring mode each contain at least one calibration mode;
    for each calibration mode, at least one calibration variable is determined as a function of at least one of a tire state variable, a driving state variable, a calibration request, and the selected monitoring mode;
    the calibration variable is determined as a function of the number of tire state variables acquired and the selected monitoring mode; and
    at least one of the following is performed:
    determining a calibration variable of a first type when at least a first predefined number of tire state variables have been considered for the determination of the calibration variable; and
    determining a calibration variable of a second type when a second predefined number of tire state variables have been considered for the determination of the calibration variable.

2. The method as recited in claim 1, wherein the monitoring mode is selected as a function of a comparison of a vehicle speed to a predefined limit value, and wherein a transition from a first monitoring mode into a second monitoring mode occurs when:
    the comparison indicates an exceedance of the limit value by the driving state variable; and
    the exceedance of the limit value persists at least for a predefined period of time;
    and wherein a check for further change of monitoring modes is terminated after the transition from the first monitoring mode into the second monitoring mode is completed.

3. The method as recited in claim 2, wherein the exceedance of the limit value for the predefined period of time indicates a plastically deformed state of the tire.

4. The method as recited in claim 1, wherein the calibration variable is determined as an average of the number of tire state variables that have been considered for the determination of the calibration variable.

5. The method as recited in claim 1, wherein the determination of the calibration variable of the first type is performed until a prerequisite condition for determination of the calibration variable of the second kind type is reached, and wherein upon determination of the calibration variable of the second type, the determination of the calibration variable is terminated, and wherein the method further comprises:
    beginning the determination of the calibration variable again when a calibration request is made.

6. The method as recited in claim 1, further comprising:
    detecting a malfunction of the tire when the determined tire state variable lies outside a predefined range with respect to the calibration variable of the monitoring mode, wherein the predefined range is selected as a function of at least one of a driving state variable and the number of tire state variables that have been considered for the determination of the calibration variable.

7. The method as recited in claim 6, wherein at least one of the following actions is taken when a malfunction is detected:
    informing the driver of the vehicle regarding the detected malfunction; and
    performing on at least one of a braking system and an active steering system of the vehicle a remedial action to counteract the cause of the malfunction.

8. The method as recited in claim 7, wherein the informing of the detected malfunction is achieved at least one of acoustically and optically.

9. The method as recited in claim 1, wherein the calibration request is performed at a point in time defined as a function of at least one of a tire change, an operation adding air to the tire, and an instruction initiated by a driver of the vehicle.

10. A method for monitoring an operating state of at least one tire of a wheel of a vehicle, comprising:
- selecting one of at least two different monitoring modes as a function of at least one driving state variable that represents a driving state of the vehicle and determined on the vehicle;
- monitoring at least one tire state variable that represents a current operating state of the tire; and
- monitoring at least one calibration variable that represents a target state of the tire, wherein for monitoring of the tire state, the at least one tire state variable is determined by a difference in wheel rotation speeds between at least two wheels, and wherein the difference in wheel rotation speeds is calculated in at least one of the following ways:
- calculating a difference in wheel rotation speeds between wheels of one axle;
- calculating a difference in wheel rotation speeds between wheels positioned diagonally with respect to one another;
- calculating a difference in wheel rotation speeds between a sum of wheel rotation speeds of the wheels of a front axle and a sum of wheel rotation speeds of the wheels of a rear axle; and
- calculating a difference in wheel rotation speeds between a sum of wheel rotation speeds of the wheels of the left side and a sum of the wheel rotation speeds of the wheels of the right side;
- wherein the calculated difference in wheel rotation speeds is normalized to the vehicle speed, and wherein the wheel rotation speeds are determined as a function of a wheel dynamics variable.

11. An apparatus for monitoring an operating state of at least one tire of a wheel of a vehicle, comprising:
- an arrangement for selecting one of at least two different monitoring modes as a function of at least one driving state variable that represents a driving state of the vehicle and determined on the vehicle;
- an arrangement for monitoring at least one tire state variable that represents a current operating state of the tire; and
- an arrangement for monitoring at least one calibration variable that represents a target state of the tire, wherein:
- a first monitoring mode and a second monitoring mode each contain at least one calibration mode;
- the apparatus further comprises an arrangement for determining, for each calibration mode, at least one calibration variable as a function of at least one of a tire state variable, a driving state variable, a calibration request, and the selected monitoring mode;
- the calibration variable is determined as a function of the number of tire state variables considered and the selected monitoring mode; and
- the arrangement for determining at least one calibration variable performs at least one of the following:
- determining a calibration variable of a first type when at least a first predefined number of tire state variables have been considered for the determination of the calibration variable; and
- determining a calibration variable of a second type when a second predefined number of tire state variables have been considered for the determination of the calibration variable.

12. The apparatus as recited in claim 11, wherein the calibration variable is determined as an average of the number of tire state variables that have been considered for the determination of the calibration variable.

13. The apparatus as recited in claim 11, wherein a malfunction of the tire is detected when the determined tire state variable lies outside a predefined range with respect to the calibration variable of the monitoring mode, and wherein the predefined range is selected as a function of at least one of a driving state variable and the number of tire state variables that have been considered for the determination of the calibration variable.

14. A computer-readable medium storing a sequence of program codes executable on a computer, the sequence of program codes performing a method of monitoring an operating state of at least one tire of a wheel of a vehicle, comprising the steps of:
- selecting one of at least two different monitoring modes as a function of at least one driving state variable that represents a driving state of the vehicle and determined on the vehicle;
- monitoring at least one tire state variable that represents a current operating state of the tire; and
- monitoring at least one calibration variable that represents a target state of the tire, wherein:
- a first monitoring mode and a second monitoring mode each contain at least one calibration mode;
- for each calibration mode, the sequence of program codes further performing the step of determining at least one calibration variable as a function of at least one of a tire state variable, a driving state variable, a calibration request, and the selected monitoring mode;
- the calibration variable is determined as a function of the number of tire state variables acquired and the selected monitoring mode; and
- the sequence of program codes further performing at least one of the following steps:
- determining a calibration variable of a first type when at least a first predefined number of tire state variables have been considered for the determination of the calibration variable; and
- determining a calibration variable of a second type when a second predefined number of tire state variables have been considered for the determination of the calibration variable.

15. A computer program product having a sequence of program codes for performing a method of monitoring an operating state of at least one tire of a wheel of a vehicle, comprising the steps of:
- selecting one of at least two different monitoring modes as a function of at least one driving state variable that represents a driving state of the vehicle and determined on the vehicle;
- monitoring at least one tire state variable that represents a current operating state of the tire; and
- monitoring at least one calibration variable that represents a target state of the tire; wherein:
- a first monitoring mode and a second monitoring mode each contain at least one calibration mode;
- for each calibration mode, at least one calibration variable is determined as a function of at least one of a tire state variable, a driving state variable, a calibration request, and the selected monitoring mode;

the calibration variable is determined as a function of the number of tire state variables acquired and the selected monitoring mode; and at least one of the following is performed:

determining a calibration variable of a first type when at least a first predefined number of tire state variables have been considered for the determination of the calibration variable; and determining a calibration variable of a second type when a second predefined number of tire state variables have been considered for the determination of the calibration variable.

* * * * *